Patented Apr. 24, 1923.

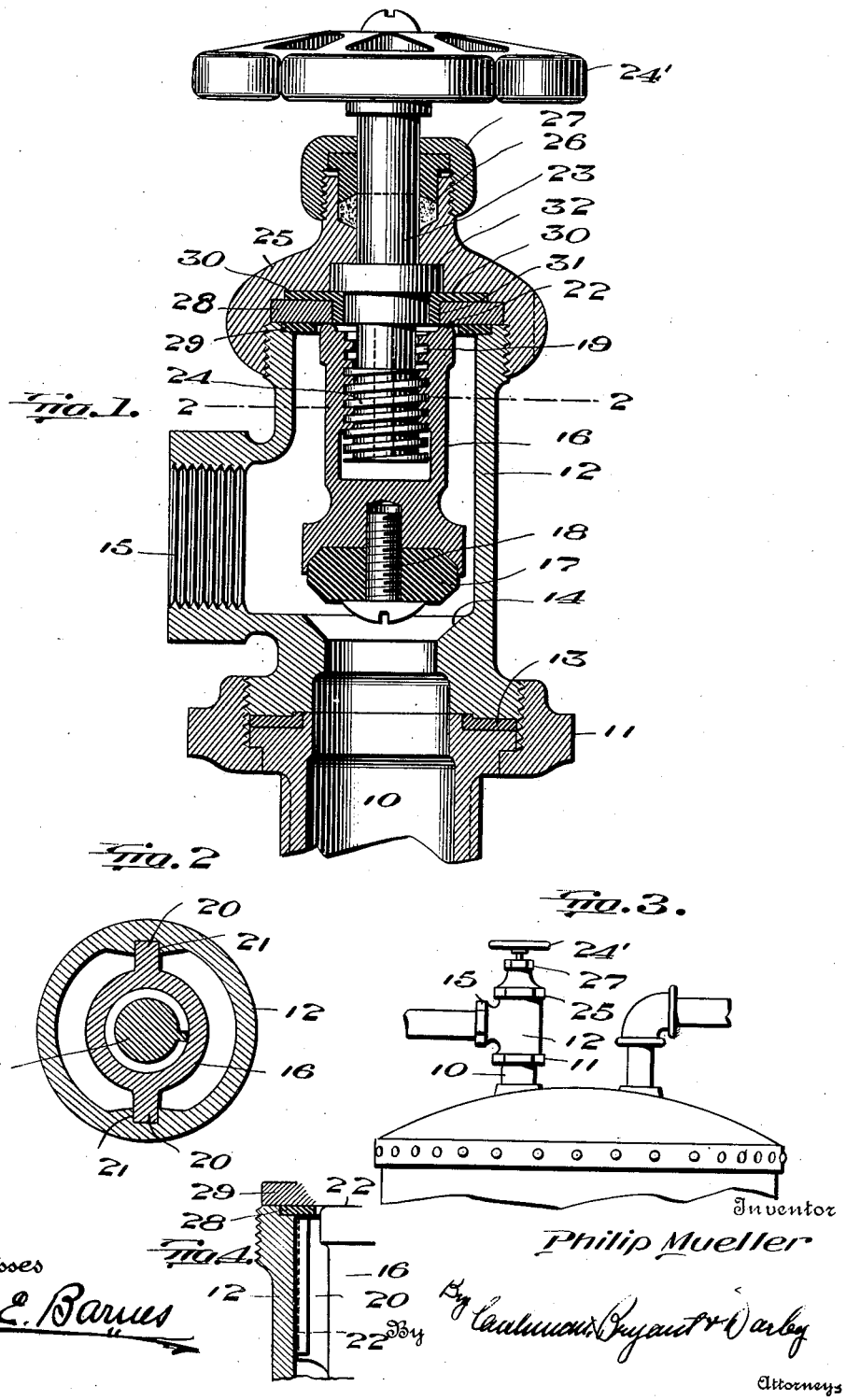

1,452,811

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

COMPRESSION COCK.

Application filed April 12, 1920. Serial No. 373,209.

*To all whom it may concern:*

Be it known that I, PHILIP MUELLER, a citizen of the United States, residing at Decatur, in the county of Macon and State of Illinois, have invented new and useful Improvements in Compression Cocks, of which the following is a specification.

The present invention relates to cocks, particularly angle cocks for use in connection with range boilers, and specifically is of the quick compression type.

It has for its object to provide a cock in which the valve will be positively and quickly moved from its seat to open position, in which open position the cock will be sealed against the escape of steam through the body cap and about the valve stem, thus eliminating the necessity of tight packing and consequent difficulty in operating the valve stem. Furthermore the construction is such that an efficient and simple bearing for the valve stem is provided, which will ensure easy and accurate movement of the stem and valve. Provision is made also to guard against undue wear of the moving valve and its guides, due to accumulation of sediment or foreign matter in the casing.

In the drawings herewith I have illustrated one embodiment of my invention, and in said drawings:

Figure 1 is a view in vertical section of a valve made in accordance with my invention.

Figure 2 is a cross sectional view substantially on the line 2—2, Figure 1.

Figure 3 is a diagrammatic view showing the cock applied to a range boiler.

Figure 4 is a detail sectional view of one of the walls of the body portion through the guiding groove and rib.

Referring to the drawings by numerals, like numbers indicating like parts in the several views, 10 indicates the boiler nipple or connection to which the cock is secured. As a convenient means of securing the cock thereto, I have shown the flanged collar or nut 11, which engages the flanged head of the connection 10, and has screw-threaded engagement with the lower end of the valve body 12, a suitable packing 13 to insure a water-tight joint being interposed between the connection 10 and the body 12.

The valve body is provided with a seat 14 and an angle nipple 15 for connection with a suitable supply-pipe. Within the body 12 is the valve 16, at the lower end of which is secured a seating member 17 of any suitable material, the member 17 being shown in the present instance mounted in a suitable seat in the lower end of the valve 16, and held therein by suitable means, as the screw 18, and it will be observed that the seating member 17 is reversible, so that upon wear of one surface of said seating member it may be reversed, and a new, unworn surface brought into use.

The upper end of the valve 16 is provided with a central bore, which has a screw-thread 19, and exteriorly is provided with guiding ribs 20 which engage grooves 21 formed on the wall of the valve casing 12. It will be observed that the guiding ribs 20 are of such length that when the valve is in full open position, as shown in Figure 1, they extend below the grooves 21, and this is of value for the reason that by elongating the guiding ribs I leave no part of the grooves exposed to receive sediment, scale, or the like, an accumulation of which would clog the grooves, and as the valve is operated tend to cut and grind out the sliding parts so as to bring about an undesirable looseness.

At its upper end the said valve 16 is provided with a bead 22 which, as shown in the present instance, is rounded so as to form a valve surface, and is intended to cooperate with a seating surface and perform the function of a cut-off valve, as will presently appear.

The valve stem 23 is provided at its lower end with a threaded portion 24, which engages the threaded bore of the valve 16, these threads being preferably of the quick acting type, so as to give a rapid opening and closing of the valve 16, the said valve stem 23 being provided with any suitable operating handle, as 24'. The said valve stem 23 is secured to the valve body 12 by means of the cap 25, which has threaded engagement with the valve body 12, and is provided with the stuffing box 26 and closing cap 27, so as to form the usual closure about the valve stem.

It is well known, however, that while this form of stuffing box is fairly efficient to prevent the escape of steam or other pressures about the valve stem, that to secure this result it is necessary to compress the packing and packing sleeve tightly about the stem, so that there is great frictional resistance to the operation of the valve. To overcome this objection I have provided means for sealing the stem completely from pressure when the valve is opened so that the necessity of setting up the packing about the valve stem to the point where there is difficulty in opening it is done away with. I accomplish this by providing a seating washer 28 of any suitable material, which rests upon the top of the valve body 12 and upon a retaining washer 29, the said seating washer 28 being of any suitable packing material which will form a sealed joint. Above the said packing washer 28, in a suitable seat formed in the cap 25, is a washer 30 provided with a downwardly turned nipple 31 which engages the packing washer 28, and within said nipple 31 the valve stem rotates. The valve stem 23 is provided with a collar 32 set in a suitable recess in the cap 25, which collar 32 takes its bearing upon the upper surface of the washer 30.

It will be seen from the foregoing that when the valve is opened, as shown in Figure 1, the beaded valve surface 22 will be drawn upwardly into close seating contact with the packing washer 28, so that pressure within the valve body 12, when the valve is opened, is entirely cut off from the valve stem, and there is no possibility of leakage through the cap or stuffing box along the stem. It will be seen that the packing washer 28 is confined between the nipple 31 and the washer 29, so that a relatively small area is exposed to the action of water and steam, and it is not readily distorted or destroyed by the action of the beaded surface 22 in the operation of the valve. Furthermore the washer 30 provides an efficient and convenient bearing for the valve stem by reason of the collar 32 on the stem, which engages and rotates upon said nippled washer.

By this construction I have provided a cock which is particularly well adapted for use, not only with range boilers, as here shown, but in any connection where it is subjected to heavy pressure, and there is danger of escape of pressure about the valve stem and through the stuffing box.

Such variations as are within the range of mechanical skill from the disclosure herein made are, of course, to be regarded as within the spirit of my invention.

I claim:

1. In a cock or faucet, the combination of a body portion having an inlet and an outlet, a valve-seat, a vertically movable valve, a valve-operating stem having a collar thereon, a body-cap having a recess to receive said collar, a collar-supporting washer having a depending nipple, and a packing between said nippled washer and said valve-body.

2. In a cock or faucet, the combination of a body portion having an inlet and an outlet, a valve seat, a vertically movable valve having a seating surface at its upper end, a rotatable valve operating stem operatively engaging said valve and having a seating surface thereon, a body-cap through which said stem passes, a packing between said cap and valve body, a washer above said packing upon which said stem-bearing rests, and a washer below said packing having a central opening of such diameter as to leave the inner periphery of said packing exposed to form a seat for the seating surface at the top of the valve.

In testimony whereof I have hereunto set my hand.

PHILIP MUELLER.